March 29, 1932.   C. C. JORDAN   1,851,632
REEL FOR WINDING YARN
Filed March 28, 1930   2 Sheets-Sheet 2

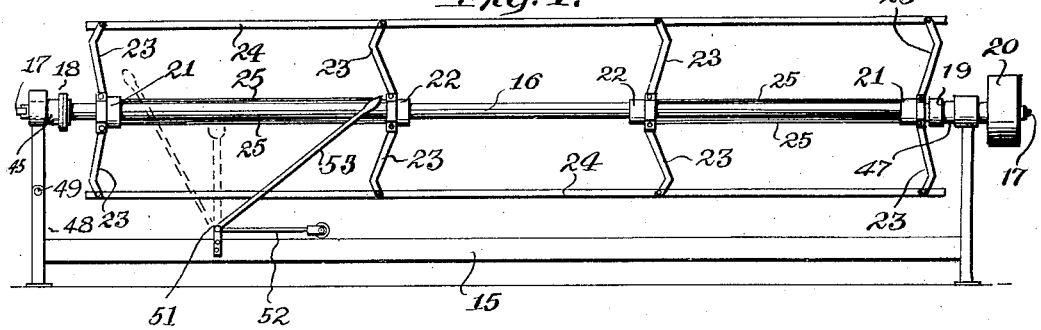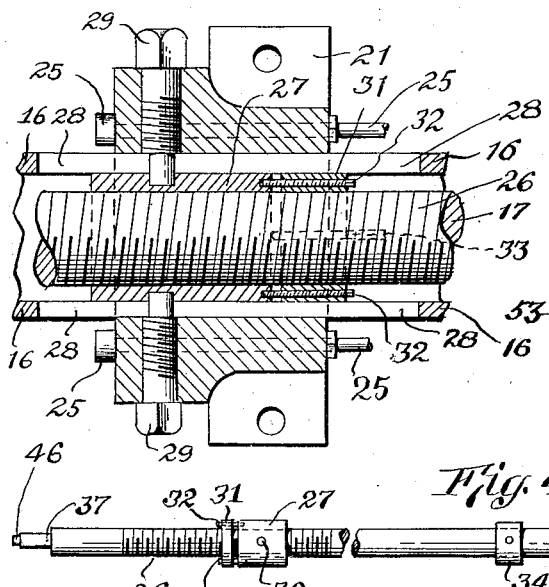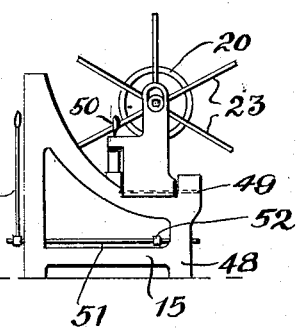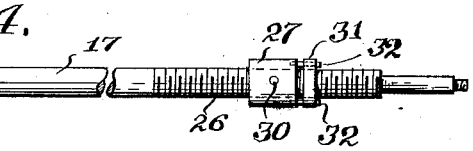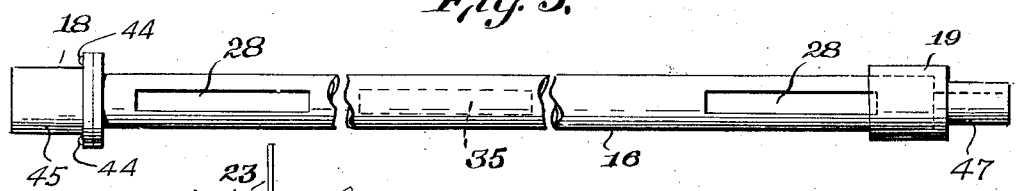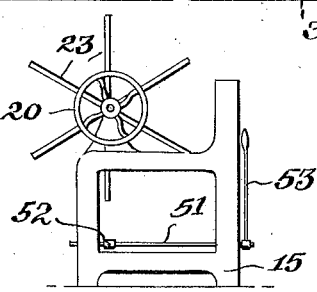

INVENTOR:
C. C. Jordan
BY J. J. Newton
ATTORNEY.

Patented Mar. 29, 1932

1,851,632

UNITED STATES PATENT OFFICE

CARL CATTES JORDAN, OF PORTERDALE, GEORGIA, ASSIGNOR TO BIBB MANUFACTURING COMPANY, OF MACON, GEORGIA, A CORPORATION OF GEORGIA

REEL FOR WINDING YARN

Application filed March 28, 1930. Serial No. 439,806.

This invention relates to improvements in reels of that type which are employed for winding yarn in skeins for mill use. It has for its object the provision of means whereby the diameter of the reel can be adjusted so that skeins of different sizes can be wound to meet different requirements and so that the diameter of a wound reel can be reduced to facilitate the removal of the skeins. The means employed for the purpose are described in detail hereinafter, pointed out in the appended claims and illustrated by the accompanying drawings.

In the accompanying drawings, in which corresponding reference characters designate corresponding parts, Figure 1 is a side elevation of a reel embodying the invention.

Figures 2 and 3 are elevations of the respective ends of the reel.

Figure 4 is a detail view, broken away in parts, showing the rod and nuts threaded thereon for adjusting the arms of the reel to vary the diameter thereof.

Figure 5 is a similar view showing the tubular shaft on which are mounted the operative parts.

Figure 12 is a longitudinal sectional view, showing the connection between the slide, nut and adjusting rod.

Figure 6:
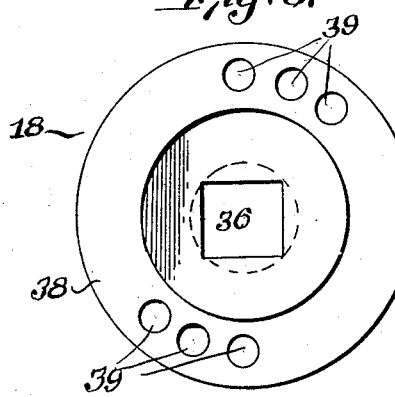
Figures 6–8 are detail views showing the adjustable coupling means between the tubular shaft and the threaded rod.

Referring to the drawings in detail, 15 designates a suitable supporting frame for the reel. Mounted between the ends of the frame is the tubular shaft 16, through which extends the adjusting rod 17. The ends of the adjusting rod pass through the caps 18 and 19, respectively attached to the ends of the tubular shaft, the caps holding the rod in axial relation to the tubular shaft. The outer ends of the caps 18 and 19 are cylindrical and, respectively, form bearings 45 and 47, which are journaled in the frame ends, providing the rotatable mounting for the reel in the frame. On the outer end of the cap 19 is the pulley 20 for rotating the combined tubular shaft and rod during a reeling operation.

Mounted to slide on the tubular shaft 16 are collars 21 and 22, preferably four in number. To each of these collars are pivoted the inner ends of the arms 23, hinged at their outer ends to the longitudinal slats 24 forming the reel. At each end of the tubular shaft the outer collar 21 and the inner collar 22 are coupled together by the rods 25 to hold the two collars in spaced relation, so that when either collar of a coupled pair is moved longitudinally on the shaft there is a corresponding movement of the other collar of the pair.

On the ends of the adjusting rod 17 are the oppositely turned screw-threads 26, each of which engages a main nut 27 fitting the bore of the tubular shaft 16. In the wall of the tubular shaft, adjacent to the travel of each nut, are the opposite longitudinal slots 28. Through these slots extend the bolts 29 threaded through the adjacent slide collar 21 and engaging at their inner ends the opposite sockets 30 in the adjacent main nut 27. At an end of each main nut 27 is a supplemental nut 31, also engaging the screwthread engaged by the adjacent main nut. The supplemental nut is adjusted with relation to the main nut by means of the opposite pins 32 threaded through the supplemental nut and engaging the main nut. Between the opposite holding pins 32 are the opposite set-pins 33 threaded through the supplemental nut and impinging on the main nut. As the threaded engagement between the nuts and adjusting rod becomes worn, lost motion between the nuts and rod can be taken up by adjusting the supplemental nut with relation to the main nut by manipulating the pins 32 and 33. On an intermediate part of the adjusting rod 17 is secured the bushing 34 fitting the bore of the tubular shaft. This bushing and the nuts 27 and 31 maintain the intermediate part of the adjusting rod in axial relation to the tubular shaft.

When the adjusting rod 17 is rotated, according to the direction of rotation, the nuts 27 are moved toward or away from each other. As each nut is connected by the bolts 29 with adjacent collar 21, the longitudinal movement of the nut within the tubular shaft will cause a corresponding movement of the adjacent collar along the exterior of the shaft. The elongated slots 28 permit movement of the collar and nut along the tubular shaft, but the bolts 29 passing through slots prevent rotation of the collar on the shaft. As each of the end collars 21 is moved, there is a corresponding movement of its companion collar 22, as the two collars are coupled by the rods 25. As shown in Figure 1 of the drawings, the parts are adjusted to provide the maximum diameter in the reel. If the movement of the two pairs of collars is inward from the position shown in Figure 1, the arms 23 are moved to lessen the diameter of the reel. It is to be observed that the inner collars 22 are not provided with directly-acting propelling nuts, but each is provided with a single guiding bolt, similar to the guiding bolt 29 that travels in a slot in the tubular shaft 16, such a slot being indicated by dotted lines at 35 on Figure 5. These slots 35 are on opposite sides of the tubular shaft and the bolts engaging with same serve to prevent turning of the collars 22 on the shaft.

Figure 7:
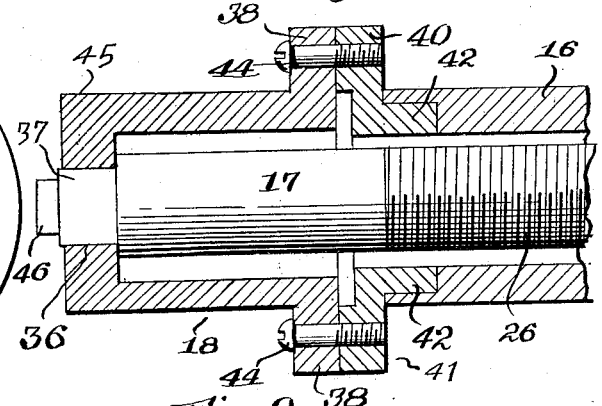
Figure 8:
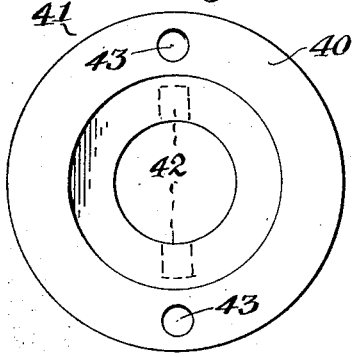
Figure 9:
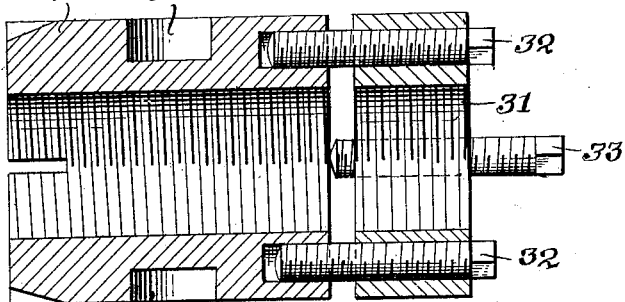
Figure 9 is an enlarged sectional view of the nut for transmitting the movement of the adjusting rod to the slide carrying the reel arm.
Figure 10:
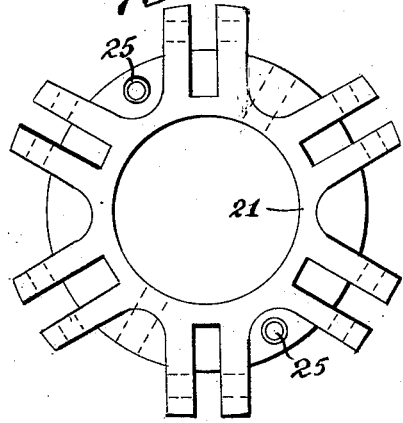
Figures 10–11 are detail views, showing the slide on the tubular shaft to which are pivoted the arms of the reel.
Figure 11:
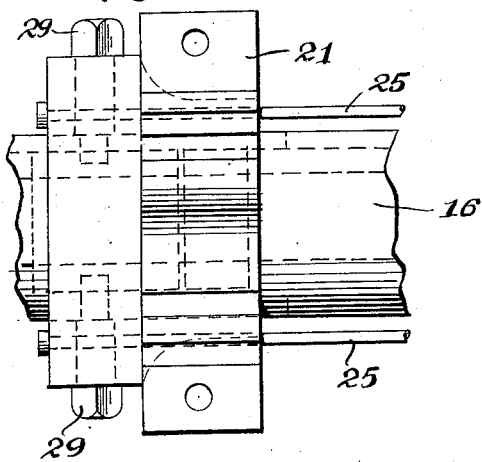

Means are provided for holding the adjusting rod 26 in its adjustments in the tubular shaft 17 for regulating the diameter of the reel. (Figures 5-8.) The rod 26 projects through a rectangular opening 36 in the head of the cap 18 and is shaped, as at 37, to fit the opening so that relative turning movement of the rod and cap is prevented. The cap is provided with a flange 38, through the opposite sides of which extend a series of openings 39. In assembled position, the flange 38 abuts the opposite flange 40 of the annular member 41 seated in the adjacent end of the tubular shaft. On the inner face of the annular member are lugs 42 engaging similarly shaped recesses in the end of the tubular shaft. This engagement between the two parts holds the annular member against turning on the tubular shaft. In the flange 40 of the annular member are the diametrically opposite holes 43 to register with the holes 39 in the flange 38 of the cap 18. Bolts 44 passing through registering openings 39 and 43 of the abutting flanges 38 and 40 hold the cap 18 in adjusted relation to the tubular shaft 16. With the cap secured to the tubular shaft, the adjusting rod 17 is held against turning in the tubular shaft by the engagement of its rectangular part 37 with the similarly shaped opening 36 in the head of the cap. The end of the rod projects beyond the cap and is shaped to form the rectangular nib 46 to be engaged by a wrench for turning the rod. The bearings 45 and 47 journaled in the frame of the machine provide the rotatable mounting for the reel.

In adjusting the diameter of the reel to meet the requirements for the skeins to be wound, the bolts 44 are withdrawn to free the cap 18 from the tubular shaft. The rod 17 is turned by a suitable tool engaging the nib 46 and this turning of the rod, through the threaded engagement therewith, moves the nuts 27 toward or from each other to adjust the arms 23 to provide the required diameter of the reel. The turning of the adjusting rod also turns the cap 18 relatively to the annular member 40 and when the rod is turned sufficiently to provide the required diameter for the reel, the flanges 38 and 40 are again secured together by the bolts 44 to hold the adjusting rod in its adjusted position in the tubular shaft. The series of holes 39 in the cap 18 permit a slight relative movement of the flanges 38 and 40 to register opposite holes so that the bolts 44 can be readily passed through the same. While only three holes 39 are shown in each series, it is to be understood that the holes can be continued around the entire flange. With the parts so assembled and fastened together, the reel will be held to the required diameter during the winding operation.

Means are provided to facilitate the removal of the wound skeins. One of the ends of the supporting frame 15, as at 48, consists of two parts hinged together at 49 so that the upper part can be turned outwardly to free the end of the tubular shaft and adjusting rod. A catch 50 is provided for holding the upper end part in upright position. A shaft 51 is journaled across the lower part of the frame 15 and fixed on an intermediate of the shaft is the arm 52. Secured on an end of the shaft is a lever 53 for turning the shaft. When the shaft is turned to position the parts as indicated by dotted lines in Figure 1, the arm 53 engages the underside of the tubular shaft 16 and supports the same while the upper part of the frame end is turned back on the pivot 49 to free the end of the reel. With the parts so positioned, skeins that have been moved to the end of the reel past the raised arm 52 can be removed from the reel. It is to be observed that the periphery of the reel is free from obstruction, so that the wound skeins can be easily slid along the reel and removed when the diameter of the reel is lessened after a winding operation.

What I claim is,

1. In a reel for winding yarn in skeins, the combination of a supporting frame, with a tubular shaft rotatably mounted in the supporting frame, an adjusting rod rotatable in the tubular shaft, opposite nuts within the tubular shaft respectively engaging right and left screw-threads of the adjusting rod, collars slidable on the tubular shaft, means connecting each collar with one of the nuts so that rotation of the adjusting rod causes travel of the collars toward and from each other according to the direction in which the rod is turned, a reel for supporting the skeins including a plurality of longitudinal slats flush with the periphery of the reel, and opposite arms contained within the periphery of the reel and hinged to each slat and respectively pivoted to the collars so that movement of said collars varies the radial distance between the slat and the tubular shaft, the adjustment of the slats operating to vary the diameter of the reel, the lessening of the diameter of the reel loosening the skeins wound thereon to be moved clear of the reel.

2. In a reel for winding yarn in skeins, the combination of a supporting frame, with a tubular shaft rotatably mounted in the supporting frame and having elongated slots in its wall, an adjusting rod rotatable in the tubular shaft, opposite nuts within the tubular shaft respectively engaging right and left screw-threads of the adjusting rod, collars slidable on the tubular shaft, a bolt connecting each collar with one of the nuts and extending through one of the slots in the tubular shaft so that rotation of the adjusting rod causes travel of the collars toward and from each other according to the direction in which the rod is turned, a reel for holding the skeins including a plurality of longitudinal slats flush with the periphery of the reel, and opposite arms contained within the reel and hinged to each slat and respectively pivoted to the collars so that movement of said collars varies the radial distance between the slat and the tubular shaft, the inward adjustment of the slats operating to lessen the diameter of the reel to permit the withdrawal of the wound skeins from the reel.

3. In a reel for winding yarn in skeins, the combination of a supporting frame, with a tubular shaft rotatably mounted in the supporting frame, an adjusting rod rotatable in the tubular shaft, opposite nuts within the tubular shaft respectively engaging right and left screw-threads of the adjusting rod, collars slidable on the tubular shaft, means for connecting each collar with one of the nuts so that rotation of the adjusting rod causes the travel of the collars toward and from each other according to the direction in which the rod is turned, means for locking the rod to the tubular shaft to hold the rod in its rotatable adjustments, a reel for holding the skeins including a plurality of longitudinal slats flush with the periphery of the reel, and opposite arms contained in the reel and hinged to each slat and respectively pivoted to the collars so that the movement of said collars varies the radial distance between the slat and the tubular shaft, the inward adjustment of the slats operating to lessen the diameter of the reel to permit the withdrawal of the wound skeins from the reel.

4. In a reel for winding yarn in skeins, the combination of a supporting frame, with a tubular shaft rotatably mounted in the supporting frame, a pair of collars slidable on each end of the tubular shafts, rods connecting the collars of each pair, an adjusting rod rotatable in the tubular shaft, opposite nuts within the tubular shaft respectively engaging right and left screw-threads of the adjusting rod, means for connecting one of the collars of each pair with one of the nuts so that rotation of the adjusting rod causes travel of the pairs of collars toward and from each other according to the direction of rotation of the adjusting rod, a reel for holding the skeins including a plurality of longitudinal slats flush with the periphery of the reel, and arms contained within the reel and hinged to each slat and pivoted to the collars of both pairs so that relative movement of the pairs of collars turns the arms to vary the radial distance between the slats and the tubular shaft, the lessening of the diameter of the reel operating to loosen the skeins wound thereon to be moved clear of the reel.

In testimony whereof I affix my signature.

CARL CATTES JORDAN.